(12) United States Patent
Shimizu et al.

(10) Patent No.: US 9,383,944 B2
(45) Date of Patent: Jul. 5, 2016

(54) DATA ACCESS ANALYSIS USING ENTROPY RATE

(71) Applicant: FUJITSU LIMITED, Kawasaka-shi, Kanagawa (JP)

(72) Inventors: Toshihiro Shimizu, Kawasaki (JP); Yuichi Tsuchimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 251 days.

(21) Appl. No.: 14/176,238

(22) Filed: Feb. 10, 2014

(65) Prior Publication Data
US 2015/0046385 A1    Feb. 12, 2015

(30) Foreign Application Priority Data

Aug. 12, 2013   (JP) ................................ 2013-167854

(51) Int. Cl.
*G06F 9/44* (2006.01)
*G06F 3/06* (2006.01)

(52) U.S. Cl.
CPC .............. *G06F 3/0676* (2013.01); *G06F 3/061* (2013.01); *G06F 3/064* (2013.01); *G06F 3/067* (2013.01); *G06F 3/0653* (2013.01); *G06F 3/0673* (2013.01)

(58) Field of Classification Search
None
See application file for complete search history.

(56) References Cited

U.S. PATENT DOCUMENTS

| | | | | |
|---|---|---|---|---|
| 6,088,718 | A * | 7/2000 | Altschuler | G06F 17/30902 707/E17.12 |
| 6,678,805 | B1 * | 1/2004 | Corduneanu | G06F 12/126 711/118 |
| 2008/0301373 | A1 * | 12/2008 | Harada | G06F 12/121 711/133 |
| 2009/0089259 | A1 * | 4/2009 | Musumeci | G06F 9/383 |
| 2010/0054164 | A1 * | 3/2010 | Lucani | H04L 1/0041 370/294 |
| 2012/0023292 | A1 * | 1/2012 | Saito | G06F 1/3203 711/114 |
| 2013/0346538 | A1 * | 12/2013 | Blinick | G06F 15/167 709/213 |

FOREIGN PATENT DOCUMENTS

| | | |
|---|---|---|
| JP | 7-319902 | 12/1995 |
| JP | 2013-114538 | 8/2013 |

OTHER PUBLICATIONS

Patent Abstracts of Japan, Publication No. 7-319902, Published Dec. 8, 1995.

* cited by examiner

*Primary Examiner* — Li-Wu Chang
(74) *Attorney, Agent, or Firm* — Staas & Halsey LLP

(57) ABSTRACT

A computer-readable non-transitory recording medium having stored therein a data analyzing program that causes a computer to execute a process. The process includes acquiring a transition matrix of data access based on a data access record of the data access; calculating an entropy rate for each of transition counts by using the transition matrix; determining mutual relevance of the data access based on the entropy rate; and storing data related to the data access on a disk, allocation of the data on the disk being determined by the mutual relevance of the data access.

5 Claims, 19 Drawing Sheets

DATA ACCESS ANALYSIS USING ENTROPY RATE

CROSS-REFERENCE TO RELATED APPLICATIONS

This application is based upon and claims the benefit of priority of the prior Japanese Patent Application No. 2013-167854, filed on Aug. 12, 2013, the entire contents of which are incorporated herein by reference.

FIELD

The embodiment discussed herein is related to a data access analysis program, a data access analysis method, and a data access analysis apparatus.

BACKGROUND

When data in a disk drive are being processed, disk access is less efficient than memory access due to the influences of the of disk access counts and the seek time. Therefore, to optimize the disk access of stored data in a storage apparatus, it is desired that a set of data which are to be accessed concurrently be stored as much as possible in the same segment of the disk.

References may be made to Japanese Laid-open Patent Publication No. 07-319902 and International Publication Pamphlet No. WO 2013/114538.

SUMMARY

According to an aspect of this disclosure, there is provided a computer-readable non-transitory recording medium having stored therein a data analyzing program that causes a computer to execute a process. The process includes acquiring a transition matrix of data access based on a data access record of the data access; calculating an entropy rate for each of transition counts by using the transition matrix; determining mutual relevance of the data access based on the entropy rate; and storing data related to the data access on a disk, allocation of the data on the disk being determined by the mutual relevance of the data access.

The object and advantages of the embodiments disclosed herein will be realized and attained by means of the elements and combinations particularly pointed out in the claims.

It is to be understood that both the foregoing general description and the following detailed description are exemplary and explanatory and are not restrictive of the invention as claimed.

DESCRIPTION OF EMBODIMENT

To improve the efficiency of data access, it is possible to acquire the access relevance between each of accessed data and other data based on access record, so that segments are divided (grouped) based on the access relevance of the data.

However, a calculation cost to determine whether data locality (localization) may contribute to the efficiency of data access when the data locality operation which aggregates (localizes) the data is performed. Further, such operation may be wasteful if it is determined that the data locality does not sufficiently help to improve the efficiency of data access. Further, as an index indicating a distribution of the data, for example, a cluster coefficient is known. However, the cluster coefficient does not always correspond to a fact of whether there exists locality (i.e., whether data are localized).

An example object of the present invention is to analyze in advance whether data are suitable for locality to improve the efficiency of data access.

In the following, embodiments are described in detail with reference to the accompanying drawings. In the following description, a disk configuration system (data allocation system) using a data access analysis method according to an embodiment is exemplarily described.

However, it should be noted that the present invention is not limited to the system using the access analysis method according to the embodiment.

Example Schematic Configuration of Disk Configuration System (Data Allocation System)

Figure 1:
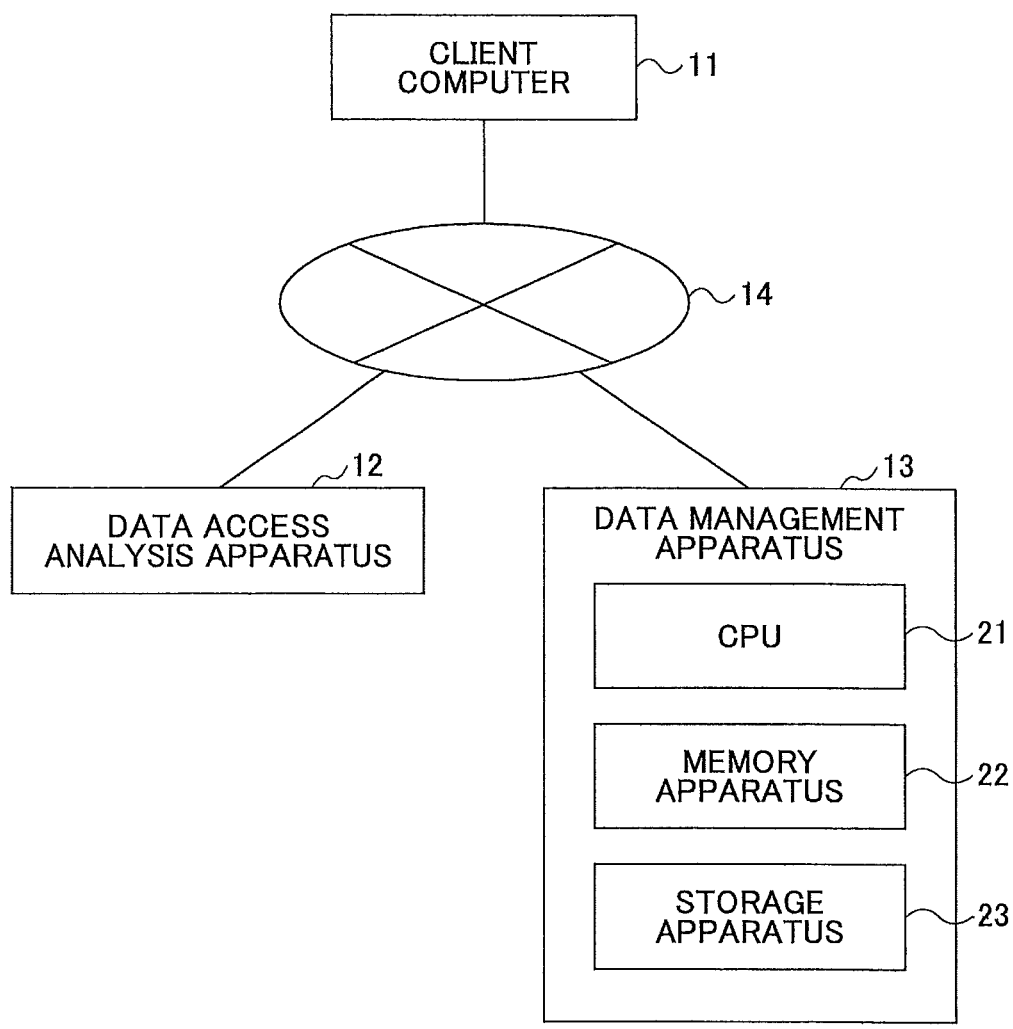
FIG. 1 illustrates an example schematic configuration of a disk configuration system (data allocation system)

FIG. 1 illustrates an example schematic configuration of a disk configuration system (data allocation system). As illustrated in FIG. 1, a disk configuration system (data allocation system) 10 includes a client computer 11, a data access analysis apparatus 12, and a data management apparatus 13. The client computer 11, the data access analysis apparatus 12, and the data management apparatus 13 are connected via a communication network 14 typically such as a Local Area Network (LAN), so that data can be transmitted to and received from each other.

The client computer 11 inputs and outputs instructions of processes in the data access analysis apparatus 12 and the data management apparatus 13 and data. Here, the client computer 11 may be, but is not limited to, a Personal Computer (PC).

The data access analysis apparatus 12 analyzes whether the efficiency of data access is improved when data locality is performed by using the data access record in the data management apparatus 13, the data access record storing data input/output information from, for example, the client computer 11. For example, the data access analysis apparatus 12 calculates relevance between two data sets which are consecutive in access sequence based on the data access record, formulates as a Markov chain, and acquires a transition matrix (sparse, matrix).

Further, the data access analysis apparatus 12 calculates, for example, an entropy rate for each of the transition counts by using the above transition matrix. Further, the data access analysis apparatus 12 determines mutual relevance of data access (e.g., data locality) based on the calculated entropy rates. For example, the mutual relevance may be estimated based on a change state of the entropy rates relative to a plurality of the number of "N"s which are integers starting from 1 and denotes the order number of the Markov chain for data access. However, the method of estimating the mutual relevance is not limited to the method described above.

Further, based on the mutual relevance (whether there exists locality) described above, the data access analysis apparatus 12 analyzes whether a plurality of data (data set) is suitable for a data configuration process (data allocation process) to a disk in the data management apparatus 13.

For example, when receiving an instruction from the data management apparatus 13, the data access analysis apparatus 12 performs the data configuration process (data allocation process), and transmits the analysis result to the data management apparatus 13.

The data management apparatus 13 includes, for example, a Central Processing Unit (CPU) 21, a memory apparatus 22, and a storage apparatus 23.

The CPU 21 is a processor serving as an arithmetic processing unit including, for example, a program counter, an instruction decoder, various computing units, a Load Store Unit (LSU), and a general-purpose register. For example, a program to be executed by the CPU 21 may be acquired via the communication network 14 or may be acquired by mounting a portable memory onto the data management apparatus 13.

The memory apparatus 22 is a storage apparatus (a cache memory) which is accessible faster than the storage apparatus 23. In the storage apparatus 23, the data provided by the data management apparatus 13 are stored by the segment. Here, the "segment" refers to a group of the data where the relevance is recognized based on the record of a data request, and the contents of the segment may be changed based on a process performed by the CPU 21.

In the memory apparatus 22, one or more segments which are accessed highly frequently among the segments stored in the storage apparatus 23 is copied. By doing this, it becomes possible for the data management apparatus 13 to promptly output data in response to a data request input from the client computer 11.

As a combination of the memory apparatus 22 and the storage apparatus 23, any combination including, for example, a Random Access Memory (RAM), a flash memory, or a Hard Disk Drive (HDD) may be used. For example, RAM is used as the memory apparatus 22, a HDD, a flash memory, a tape, a DVD, a CD, a Blu-ray (registered trademark) Disc or the like is used as the storage apparatus 23. However, it should be noted that a possible combination is not limited to the this example.

Further, the configuration of the data management apparatus 13 is not limited to the configuration described above. For example, the data management apparatus 13 may include a ROM storing a Basic Input Output System (BIOS) or a program memory.

The data access analysis apparatus 12 and the data management apparatus 13 may be, for example, but are not limited to a server or a PC. The data access analysis apparatus 12 may be provided in the data management apparatus 13.

In the disk configuration system 10 of FIG. 1, each of the number of the client computer 11, the data access analysis apparatus 12, and the data management apparatus 13 is two or more. Therefore, for example, one data access analysis apparatus 12 may perform data access analysis on each of the data management apparatuses 13.

Next, example functional configurations of the data access analysis apparatus 12 and the data management apparatus 13 are described with reference to FIG. 2.

Example Functional Configuration of Data Access Analysis Apparatus 12

Figure 2:
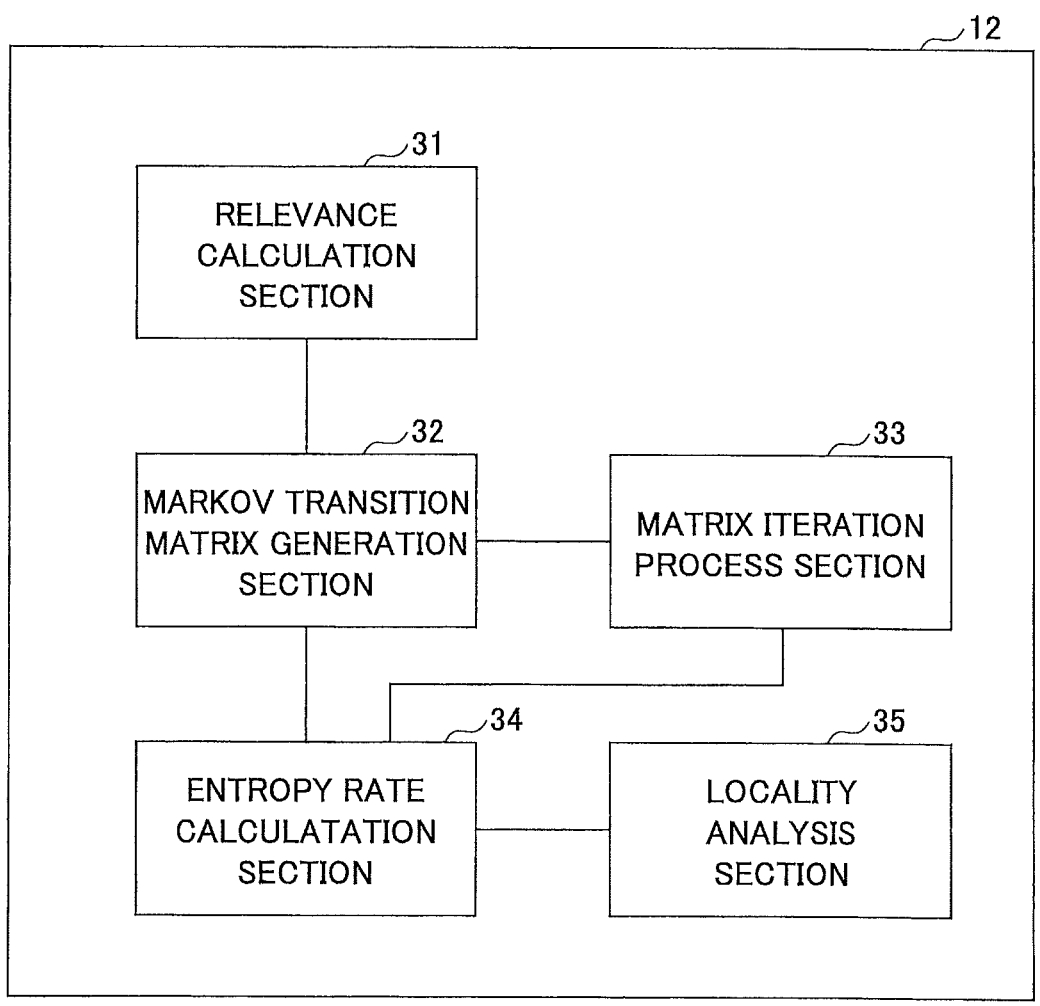
FIG. 2 illustrates an example functional configuration of a data access analysis apparatus.

FIG. 2 illustrates an example functional configuration of the data access analysis apparatus 12. As illustrated in FIG. 2, the data access analysis apparatus 12 includes a relevance calculation section 31, a transition matrix generation section 32, a matrix iteration process section 33, an entropy rate calculation section 34, and a locality analysis section 35.

The relevance calculation section 31 counts the relevance between two data sets which are consecutive in access sequence based on the data access record acquired from the data management apparatus 13.

The transition matrix generation section 32 uses, for example, a Markov chain to formulate a plurality of relevances acquired from the relevance calculation section 31 and acquires a transition matrix (sparse matrix) "P". The method of acquiring the transition matrix is not limited to the method described above.

The matrix iteration process section 33 multiplies the sparse matrixes corresponding to the transition counts acquired by the transition matrix generation section 32 and calculates a static state "$\mu$" which corresponds to the transition matrix "P" by using an iterative multiplication process which is previously set.

The entropy rate calculation section 34 calculates entropy rates corresponding to the transition counts based on a calculation formula which is previously set and, based on the calculation result, determines (finds out) the hop number of the connection nodes (data to continuously read out) which exceeds the logarithm of the segment size of the entropy. Here, the "hop number" refers to, for example, a number that is counted whenever the segment to be accessed is changed (transition counts).

For example, when the data sets are accessed in the segment which is the same as the segment currently accessed, the hop number is 1 (h=1). When the data sets are accessed in the segment which is different from the segment currently accessed, the hop number is 2 (h=2). Similarly, whenever the segment is changed (transited), the hop number is counted (calculated).

The locality analysis section 35 analyzes the locality by using the hop number "h". The "locality" refers to, for example, but is not limited to, a characteristic that two data sets accessed at the same time once are more likely to be accessed at the same time again. For example, the locality analysis section 35 calculates, for example, a cache hit rate (1−1/h) or a cache miss rate (1/h) and determines the value of the rate as a guess value indicating the effect of the data locality. The "cache hit rate" refers to a rate where the consecutive sequence data are included in the cache. The "cache miss rate" refer to a rate where the consecutive sequence data are not included in the cache. The locality analysis section 35 transmits the analysis result to the data management apparatus 13 via the communication network 14.

Here, the above-described process of the data access analysis apparatus 12 may be executed based on the instruction from the data management apparatus 13 or the client computer 11.

Example Functional Configuration of Data Management Apparatus 13

Figure 3:
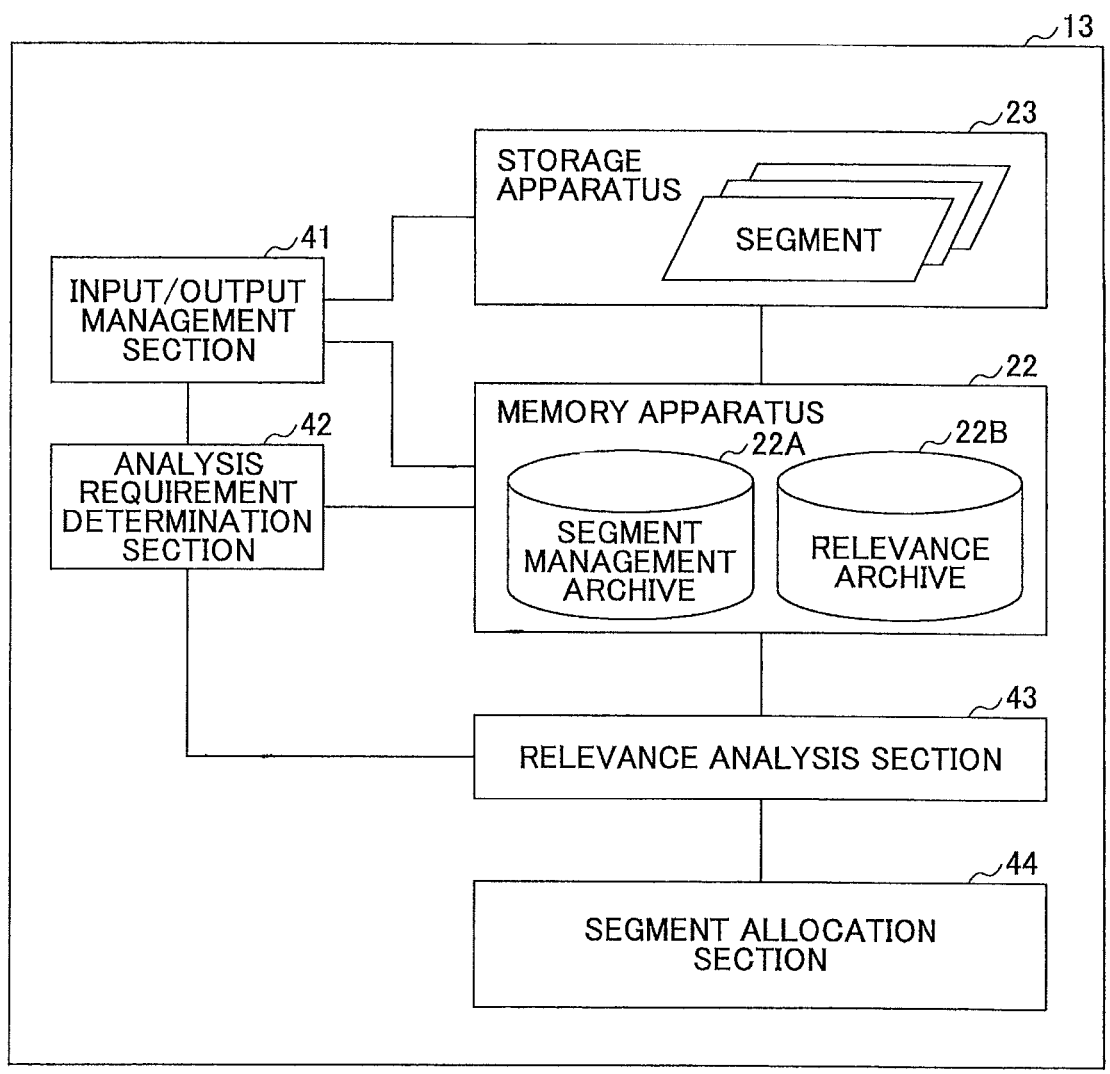
FIG. 3 illustrates an example functional diagram of a data management apparatus.

FIG. 3 illustrates an example functional diagram of the data management apparatus 13. As illustrated in FIG. 3, the data management apparatus 13 includes an input/output management section 41, an analysis requirement determination section 42, a relevance analysis section 43, a segment allocation section 44, the memory apparatus 22, and the storage apparatus 23. Here, the input/output management section 41, the analysis requirement determination section 42, the relevance analysis section 43, and the segment allocation section 44 are examples of functional sections that are to be functioned (actioned) when the CPU 21 executes a program.

The input/output management section 41 searches the memory apparatus 22 and the storage apparatus 23 based on a data request input from a request source such as the client computer 11, and transmits the requested data to the request source. As described above the client computer 11 transmits the data request.

However, any other subject including a process executed in the data management apparatus 13 may be an issuing (request) source that transmits the data request. Further, when an input/output apparatus is connected to the data management apparatus 13, it is assumed that a user may input the data request to the input/output apparatus.

When the data request is input, the input/output management section 41 searches the memory apparatus 22. When the data designated by the data request exist in the memory apparatus 22, the input/output management section 41 reads out the data from the memory apparatus 22 and transmits the data to the request source. Further, when the data designated by the data request do not exist in the memory apparatus 22, the input/output management section 41 searches the storage apparatus 23.

When the data designated by the data request exist in the storage apparatus 23, the input/output management section 41 reads out the data from the storage apparatus 23 and transmits the data to the request source. In this case, the input/output management section 41 copies the segment to which the read data belong into a segment management archive 22A of the memory apparatus 22.

In this case, the input/output management section 41 may unconditionally copy the segment from the storage apparatus 23 into the segment management archive 22A. Otherwise, the input/output management section 41 may acquire access frequencies of the segments for a certain period of time and preferentially copy the segments accessed more frequently based on the access frequencies of the segments.

The analysis requirement determination section 42 determines whether the relevance analysis section 43 performs relevance analysis based on the relationship between the data request and the segment. The relevance analysis section 43 performs relevance analysis on the data including the data request input to the input/output management section 41 in the relevance archive 22B of the memory apparatus 22, and determines the segment based on the analysis result. Based on the determination by the relevance analysis section 43, the segment allocation section 44 updates the segment configuration.

Hardware Configuration

Figure 4:
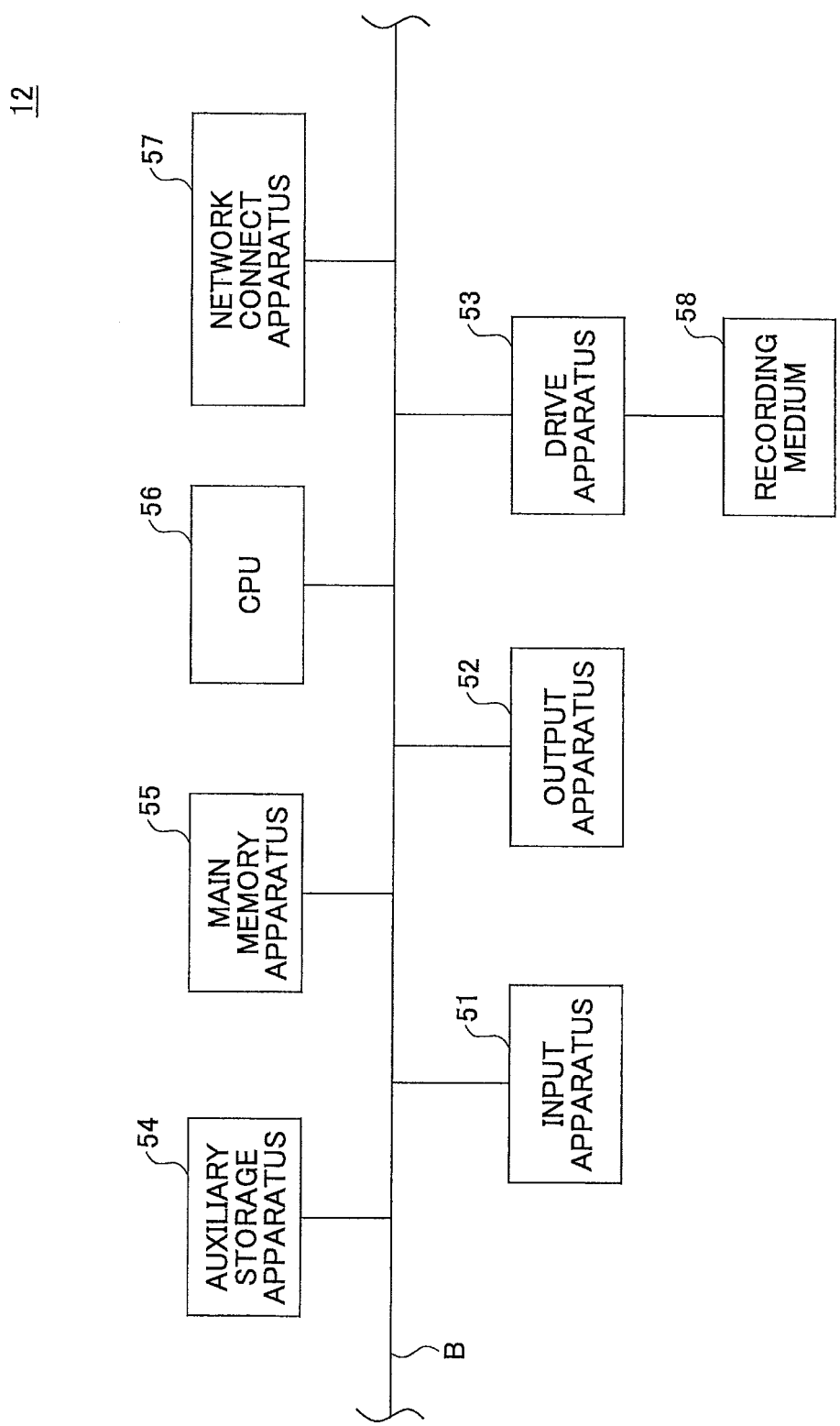
FIG. 4 illustrates an example hardware configuration of the data access analysis apparatus.

Next, an example hardware configuration of the data access analysis apparatus 12 is described with reference to FIG. 4. FIG. 4 illustrates an example hardware configuration of the data access analysis apparatus. As illustrated in FIG. 4, the data access analysis apparatus 12 includes an input apparatus 51, an output apparatus 52, a drive apparatus 53, an auxiliary storage apparatus 54, a main memory apparatus 55, a CPU 56, and a network connection apparatus 57. Those elements are mutually connected via a system bus B.

The input apparatus 51 receives inputs of, for example, a program execution instruction, various operational information, information to start up software from, for example, a user using the data access analysis apparatus 12. The input apparatus 51 includes a keyboard, a pointing device such as a mouse, and a voice input device such as a microphone that are operated by, for example, a user of the data access analysis apparatus 12.

The output apparatus 52 includes a display to display, for example, various windows and data that are desired to operate the data access analysis apparatus 12 according to this embodiment, so as to display, for example, an executing process of a program and a result by using a control program of the CPU 56.

Here, the execution program to be installed in the computer storage area such as the data access analysis apparatus 12 is provided by using, for example, a recording medium 58. The recording medium 58 in which the program is recorded can be set in the drive apparatus 53, so that the execution program included in the recording medium 58 can be installed from the recording medium 58 into the auxiliary storage apparatus 54 via the drive apparatus 53 based on a control signal from the CPU 56.

Based on the control signal from the CPU 56, the auxiliary storage apparatus 54 stores, for example, an execution program and a control program in the computer according to this embodiment and inputs and outputs those programs when necessary. The auxiliary storage apparatus 54 can read out necessary information from stored information and write information based on, for example, the control signal from the CPU 56. The auxiliary storage apparatus 54 may be, for example, a storage means such as an HDD or an Solid State Drive (SSD).

The main memory apparatus 55 temporarily stores at least a part of an Operation System (OS) program and an application program to be executed by the CPU 56. Further, the main memory apparatus 55 stores various data necessary for a process performed by the CPU 56. The main memory apparatus 55 may be, for example, a ROM or a RAM.

The CPU 56 controls, for example, various calculations, input and output of data from and to various hardware elements, and a process of the entire computer such as the data access analysis apparatus 12 based on a control program such as the OS and an execution program stored in the main memory apparatus 55, so as to realize various processes. The CPU 56 can acquire various information necessary during the program execution from, for example, the auxiliary storage apparatus 54 and store the execution results.

For example, by executing a program (e.g., a data access analysis program) installed in the auxiliary storage apparatus 54 based on, for example, the execution instruction of the program acquired from the input apparatus 51, the CPU 56 performs a process corresponding to the program on the main memory apparatus 55.

For example, by executing the data access analysis program, the CPU 56 executes the processes such as, but not limited to, the calculation of the relevance of the access sequence in the relevance calculation section 31, the generation of the transition matrix in the transition matrix generation section 32, the matrix iterative calculation in the matrix iteration process section 33, the calculation of the entropy rate in the entropy rate calculation section 34, and locality analysis in the locality analysis section 35. The contents executed by the CPU 56 are stored in the auxiliary storage apparatus 54 when desired.

Based on a control signal from the CPU 56, by connecting to, for example, the communication network 14, the network connection apparatus 57 communicates with, for example, the client computer 11 and the data management apparatus 13. For example, by receiving a data access analysis request from the data management apparatus 13, the network connection apparatus 57 can execute the data access analysis process according to this embodiment.

The network connection apparatus 57 can acquire, for example, an execution program, an application, software, and setting information from an external apparatus and the like connected thereto. Further, the network connection apparatus 57 can provide an execution result acquired by executing the program or the execution program itself according to this embodiment to an external apparatus and the like.

The recording medium 58 stores the execution program described above and the like that can be read by a computer. The recording medium 58 may be, but it not limited to, a semiconductor memory such as a flash memory or portable recording medium such as a CD-ROM or a DVD.

By having a hardware configuration described above, it becomes possible to execute the data access analysis process according to this embodiment. In this embodiment, an execution program causing a computer to execute the functions (data access analysis program) is stored in a general-purpose PC or the like, so that the hardware resources and the software can cooperate with each other to realize the data access analysis process according to this embodiment. The client computer 11 and the data management apparatus 13 may use the same configuration.

Example Process of Disk Configuration System 10

Figure 5:
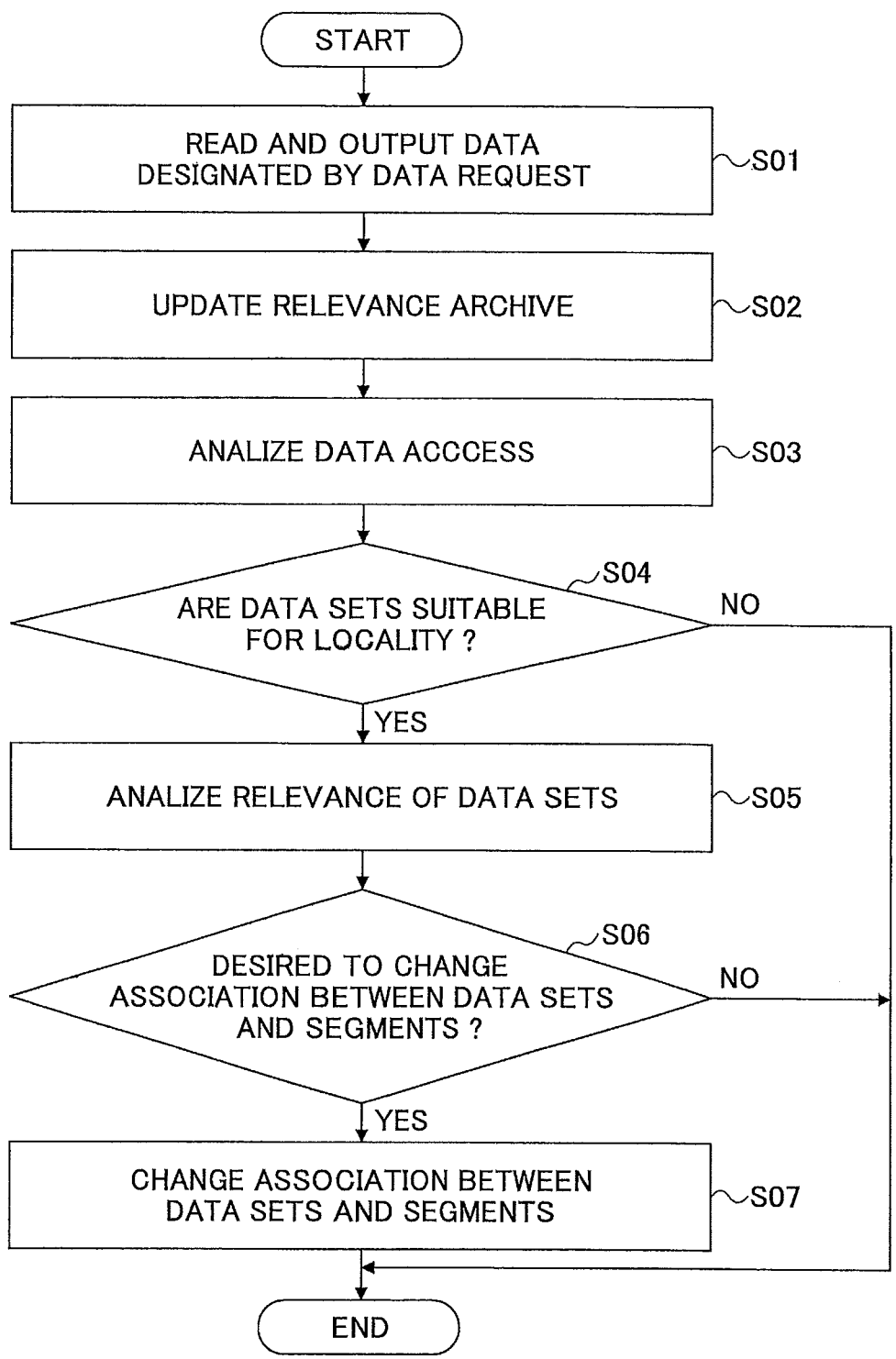
FIG. 5 is a flowchart of an example process of the disk configuration system (data allocation system)

Next, an example process of the disk configuration system 10 is described with reference to a flowchart. FIG. 5 is a flowchart of an example process of the disk configuration system. The process of FIG. 5 is executed whenever the data request is performed on the data management apparatus 13.

In the example of FIG. 5, the input/output management section 41 reads out the data in the memory apparatus 22 or the storage apparatus 23, the data being designated by the data request from the client computer 11, and outputs the data to the client computer which is the request source (step S01).

Next, the input/output management section 41 associates the data requested this time with the data previously requested and updates the relevance archive 22B (step S02). When the relevance archive 22B is updated, the data access analysis apparatus 12 executes data access analysis (step S03). Next, based on the analysis result acquired in step S03, it is determined whether the data (data set) are suitable for locality (whether locality exists) (step S04).

In step S04, by comparing the cache miss rate or the cache hit rate acquired in step S03 with the predetermined threshold value, it is determined whether the data sets are suitable for locality. For example, when the cache miss rate is less than or equal to a threshold value "a" (e.g., 15%) or when the cache hit rate is greater than or equal to a threshold value "b", it may be determined that the data sets are suitable for locality. However, the present invention is not limited to this example.

In step S04, when it is determined that the data sets are suitable for locality (YES in step S04), the relevance analysis section 43 analyzes the relevance of the data (step S05). In this case, the relevance analysis section 43 may determine whether it is desired to analyze the relevance of data first. Then, when determining that it is desired to analyze the relevance of data, the relevance analysis section 43 may analyze the relevance of data in step S05. In step S04, when determining that the data sets are not suitable for locality (NO in step S04), the process ends.

Next, based on the analysis result of the relevance analysis section 43, the segment allocation section 44 determines whether it is desired to change the association between the data and the segment (step S06). When determining that it is not desired to change the association between the data and the segment (NO in step S06), the process ends.

When determining that it is desired to change the association between the data and the segment (YES in step S06), the segment allocation section 44 changes the association between the data and the segment, and allocate and store the data (step S07).

Example Process in the Data Access Analysis Apparatus 12

Figure 6:
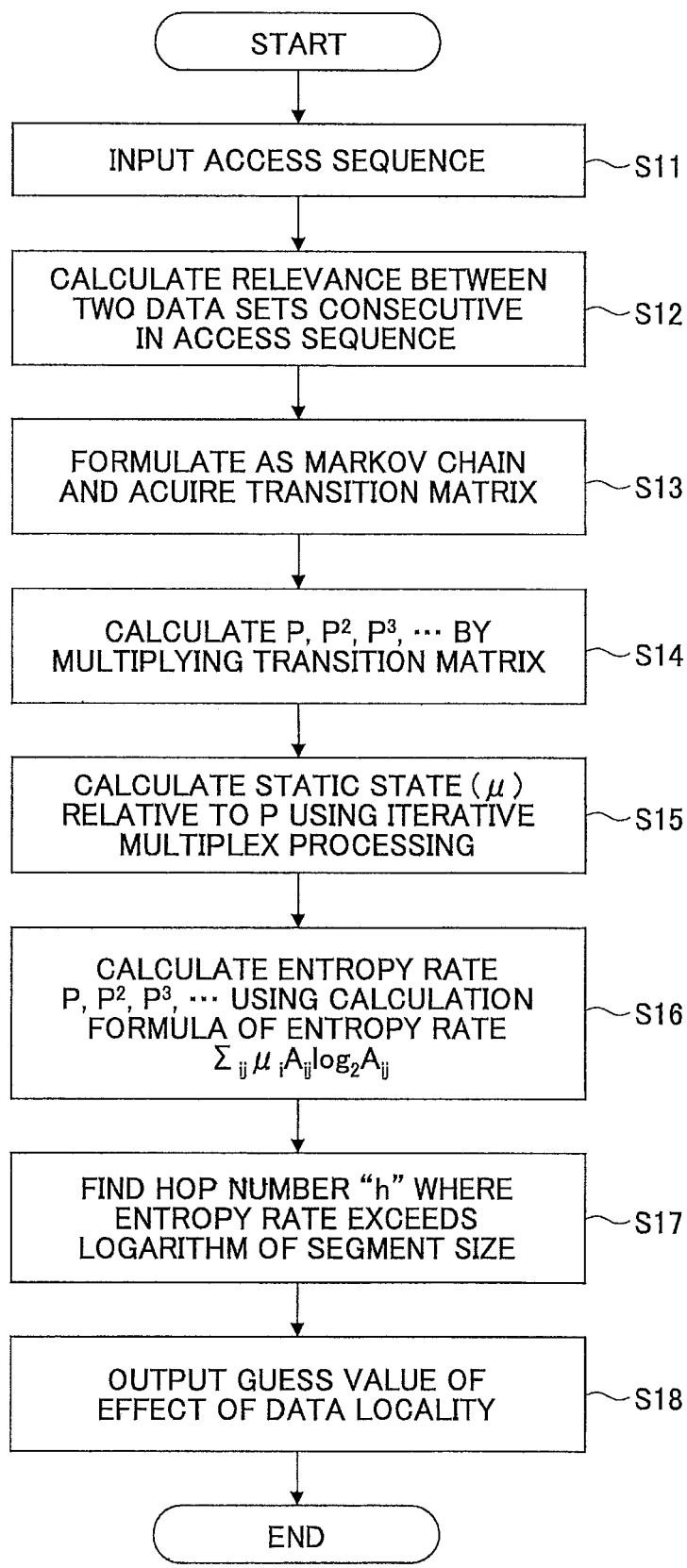
FIG. 6 is a flowchart of an example process of the data access analysis apparatus.

Next, an example process in the data access analysis apparatus 12 corresponding to step S04 is described with reference to a flowchart. FIG. 6 is a flowchart of an example process of the data access analysis apparatus 12.

In FIG. 6, the data access analysis apparatus 12 inputs the access sequence (a set of accessed data (data access record)) from the relevance archive 22B (step S11), and counts the relevance of two data sets which are consecutive in access sequence (step S12). In step S12, for example, the probability that the two data sets are consecutively accessed is statistically calculated.

Next, the data access analysis apparatus 12 formulates the counted relevance as, for example the Markov chain to acquire the transition matrix P (step S13).

Next, the data access analysis apparatus 12 multiplies the transition matrix P by the sparse matrix to calculate P, $P^2$, $P^3$, . . . (step S14). Next, the data access analysis apparatus 12 calculates the static state "$\mu$" relative to P by using an iterative multiplication process such as the Power method (step S15). The Power method refers to a method to acquire the eigenvalue with the maximum absolute value and the eigenvector belonging thereto by repeatedly multiplying a vector by a matrix based on the characteristics of the eigenvalue and the eigenvector. For example, the Power method may be realized by using a framework such as MapReduce.

Next, the data access analysis apparatus 12 calculates the entropy rates $e_1$, $e_2$, $e_3$, . . . , corresponding to the transition matrixes P, $P^2$, $P^3$, . . . of the transition counts based on a formula of the entropy rate (e.g., $\Sigma_{ij}\mu_i A_{ij} \log_2 A_{ij}$) (step S16).

Next, the data access analysis apparatus 12 finds the hop number "h" where the entropy rate acquired in step S16 exceeds the segment size (step S17). In step S17, the data access analysis apparatus 12 approximately acquires a curve line f(h) expressing the relationship between the hop number and the entropy rate based on the entropy rates $e_1$, $e_2$, $e_3$, . . . by using, for example, a predetermined polynomial equation. Further, based on the acquired approximated curved line, the data access analysis apparatus 12 finds the hop number "h" where the hop number exceeds the logarithm of the segment size "s" ($\log_2 s$). Namely, the maximum value of "h" where $f(h) \leq \log_2 s$ is acquired.

Next, the data access analysis apparatus 12 outputs a guess value indicating the effect of the data locality as an analysis result, the guess value being acquired by using the hop number "h" (step S18). The guess value may be, but is not limited to, the cache miss rate (1/h) or the cache hit rate (1−1/h).

By the process described above, it becomes possible to analyze in advance whether the data sets are suited for locality. Accordingly, it becomes possible to estimate in advance the effect of data reconfiguration in locality in a large-scale distribution system where it would not be possible to know in advance how much effect to be expected. By doing this, it becomes possible to avoid a wasteful investment.

Data Access Analysis

Next, the analysis of data access in this embodiment is described in detail. Recently, a high-performance server can be obtained easily at low cost so that it becomes easier to perform data distributed processing using the servers. More attention is being paid to the field of big data. When big data are to be processed, a large amount of data that cannot be stored in a memory also need to be processed.

Therefore, it is desired to utilize a storage device. However, when the data on the storage device are to be used, disk access is less efficient than memory access. Therefore, it is desired to reduce the number of disk access and the seek time.

To optimize the disk access, the data management apparatus 13 reconfigures the data by using locality. Specifically, in a data store where a large amount of data can be stored, data are stored as a certain body of a segment, and when the data sets are accessed, the access pattern is analyzed. Then, a plurality of data where the relevance of the access pattern is high (accessed approximately at the same time) are stored in the same segment. By doing this, it becomes possible to read data having high relevance from a slow storage apparatus to a fast storage apparatus at the same time and improve the efficiency of the data access.

Further, by determining the optimized configuration in advance, it becomes possible to estimate the effect. Further, when the division of data is known, the effect can be estimated by using the cache miss rate or the like. The method of division may include, but is not limited to, a method using heuristics.

Here, as a method of using heuristics, for example, a method of optimizing a graph partition such as Conductance or Modularity may be used. However, in those methods, random access is frequently used. Therefore, desired performance in disk operation may not be achieved. Further, as a method of estimating the effect based on an index indicating the graph characteristic, there may be a method using a cluster coefficient, Diameter, degree distribution analysis or the like. However, those are not appropriate as an index indicating the locality.

Figure 7:
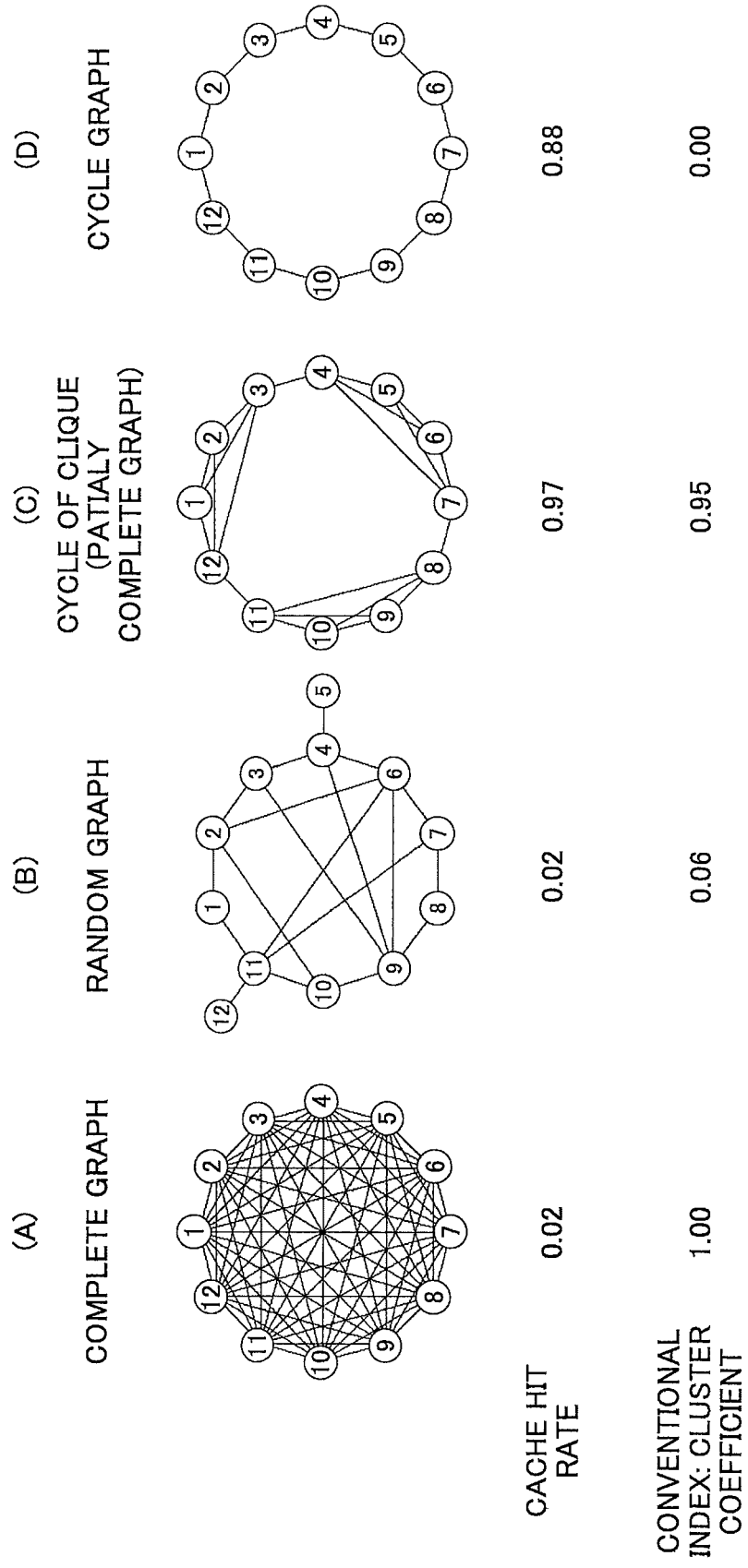
FIG. 7 illustrates a cache hit rate corresponding to access sequence patterns.

FIG. 7 illustrates a cache hit rate corresponding to access sequence patterns. In FIG. 7, for access sequence patterns, probability matrixes are visually expressed in graphs along with index values using the cluster coefficients. Part (A) of FIG. 7 illustrates a sequence pattern of a complete graph. Part (B) of FIG. 7 illustrates a sequence pattern of a random graph. Part (C) of FIG. 7 illustrates a cycle of a clique (partially complete graph). Part (D) of FIG. 7 illustrates a cycle graph. Here, the nodes denote data and branches denote routes to the next data (consecutive data).

Further, the cache hit rates in FIG. 7 are the values acquired by actually measuring using a predetermined optimal division method. When the cache hit rate is increased, the number of disk access (disk reads) is accordingly reduced. Therefore, in such a case, the effect of locality is high.

For example, in the complete graph in part (A) of FIG. 7, when certain data are accessed, the candidates of data that can be accessed next are all data. Therefore, there is no locality in the access sequence. Therefore, the cache hit rate is lowered (0.02 in part (A) of FIG. 7). However, the cluster coefficient, which is a conventional index, conversely indicates 1.00.

In the cycle graph in part (D) of FIG. 7, after certain data set is accessed, there are only two candidate data sets that are to be accessed next. Therefore, there exists locality in the access sequence. Accordingly, the cache hit rate becomes high (0.88 in part (D) of FIG. 7). However, the cluster coefficient of the conventional index differently indicates 0.00.

Similarly, in the random graph in part (B) of FIG. 7, the cache hit rate does not correspond to the cluster coefficient value. Based on the above, the indexes indicating the graph characteristics such as the cluster coefficient may not be appropriate to indicate the locality.

To resolve the problem, as described above, in this embodiment, the entropy rate is used in the data access analysis apparatus 12 without actually clustering, so as to estimate the effect at low cost. Further, only sequential access process is used. Therefore, when compared with the heuristic method where random access is frequently used, the calculation can be done faster.

Transition Matrix Formulated as Markov Chain

Figure 8:
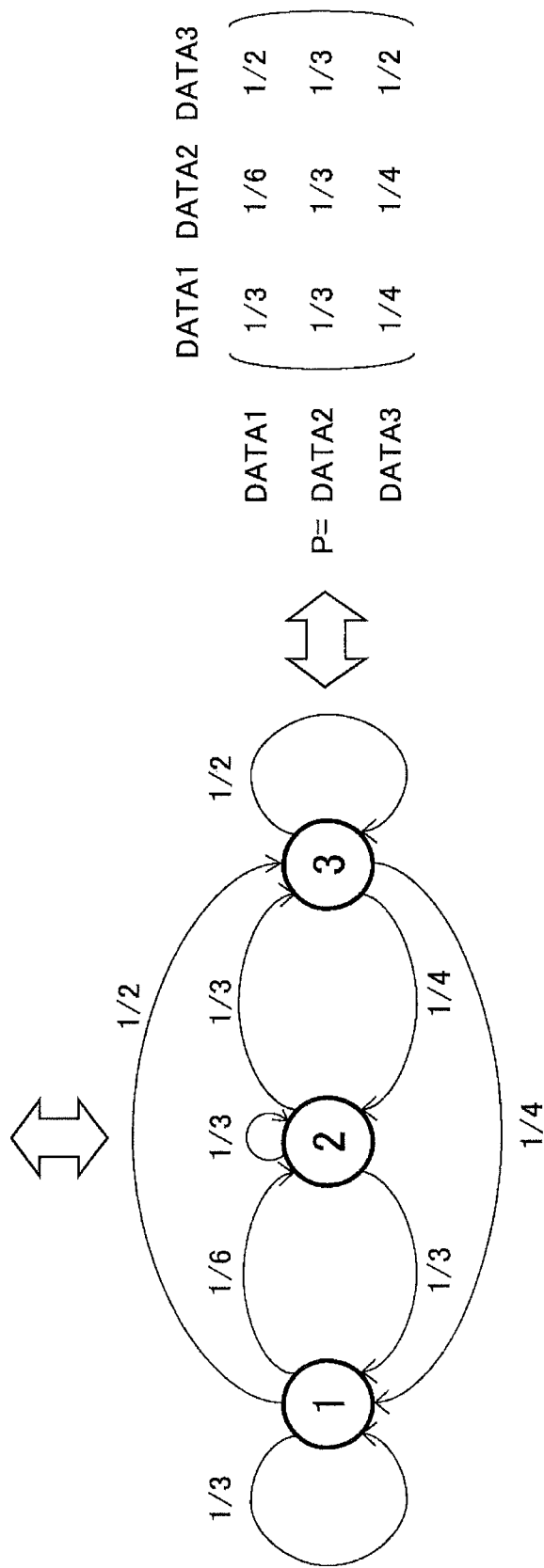
FIG. 8 illustrates a Markov chain.

Next, the transition matrix formulated as the Markov chain is described with reference to FIG. 8. FIG. 8 illustrates a transition matrix formulated as the Markov chain. In this embodiment, the access sequence is formulated as the Markov chain. For example, when the probability where two certain data sets are consecutively accessed is expressed using the Markov chain, the value of FIG. 8 is acquired. In the example of FIG. 8, it is assumed that one data set (data group) includes data 1, 2, and 3. The "data set" herein refers to a data group that are accessed within one session.

For example, the relevance calculation section 31 of the data access analysis apparatus 12 acquires the probability values where two data sets are consecutively accessed when the access sequence indicates that data are sequentially accessed in the order of 1, 3, 3, 2, 1, 2, 3, . . . . Based on the calculation results, as illustrated in FIG. 8, the relevance calculation section 31 acquires the probability values including "1/3" as probability where "data 1" is accessed after "data 1" is accessed, "1/6" as probability where "data 2" is accessed after "data 1" is accessed, and "1/2" as probability where "data 3" is accessed after "data 1" is accessed. Further, based on the probability values, the relevance calculation section 31 generates the transition matrix (sparse matrix) as illustrated in FIG. 8.

In this embodiment, for example, the entropy rate for each of the transition counts (e.g., 1, 2, and 3 hop numbers) is calculated. Then, based on the change status thereof (e.g., increasing phenomenon), it is predicted whether the data sets are suitable for locality. The entropy rate "e" can be calculated based on the following formula (1) where the transition matrix is given as "P".

$$e = -\Sigma_{ij} \mu_i A_{ij} \log_2 A_{ij} \quad (1)$$

In Formula (1), the symbol "µ" denotes the static state, namely is a row vector satisfying "µP=µ", and can be quickly acquired by using the Power method or the like. Further, the symbol "A" denotes a matrix. The letters "i" and "j" denote the lateral elements (i) and vertical elements (j) in the transition matrix.

In this embodiment, it is thought that the disk access occurs due to the change of the segment (cluster) which occurs for each of the hop numbers where the entropy rate exceeds the segment size (cluster size).

In this case, the entropy rate "$Q_k$" of "k-hop" is measured based on the following formula.

$$Q_k = (\alpha_0 I + \alpha_1 P + \alpha_2 P^2 + \ldots + \alpha_{k-1} P^{k-1})/(\alpha_0 + \alpha_1 + \ldots + \alpha_{k-1})$$

Where "$\alpha_0 + \alpha_1 + \ldots + \alpha_{k-1}$" is a positive real number, and "I" denotes a unit matrix.

For example, when the transition matrix as illustrated in FIG. 8 is measured with respect to a certain data set and it is assumed that the following Formula (2) is acquired.

$$P = \begin{pmatrix} 0 & 1 & 0 \\ 0 & 0 & 1 \\ 1 & 0 & 0 \end{pmatrix} \quad (2)$$

In this case, by calculating "$\mu P = \mu$", $\mu = (1/3, 1/3, 1/3)$ is obtained. When it is assumed that "$\alpha_i = 1$", "$Q_2$" is expressed in the matrix of Formula (3).

$$Q_2 = \frac{I+P}{2} = \begin{pmatrix} 1/2 & 1/2 & 0 \\ 0 & 1/2 & 1/2 \\ 1/2 & 0 & 1/2 \end{pmatrix} \quad (3)$$

Therefore, by assigning the above result "$Q_2$" in "A" of formula (1), the entropy rate "$e_2 = 1/2$" is acquired as illustrated in Formula (4).

$$e_2 = -\sum_{ij} \mu_i A_{ij} \log_2 A_{ij} = \quad (4)$$

$$-\left(\frac{1}{3} * \frac{1}{2} * \log_2 \frac{1}{2} + \frac{1}{3} * \frac{1}{2} * \log_2 \frac{1}{2} + \frac{1}{3} * \frac{1}{2} * \log_2 \frac{1}{2}\right) = \frac{1}{2}$$

Further, the same operations are calculated with respect to $Q_3, Q_{24}, \ldots$ so as to acquire the hop number "h" where the entropy rate "e" exceeds the logarithm of the segment size. Further, by using the acquired hop number, the cache hit rate $(1-1/h)$ and the cache miss rate $(1/h)$ can be acquired.

Figure 9:
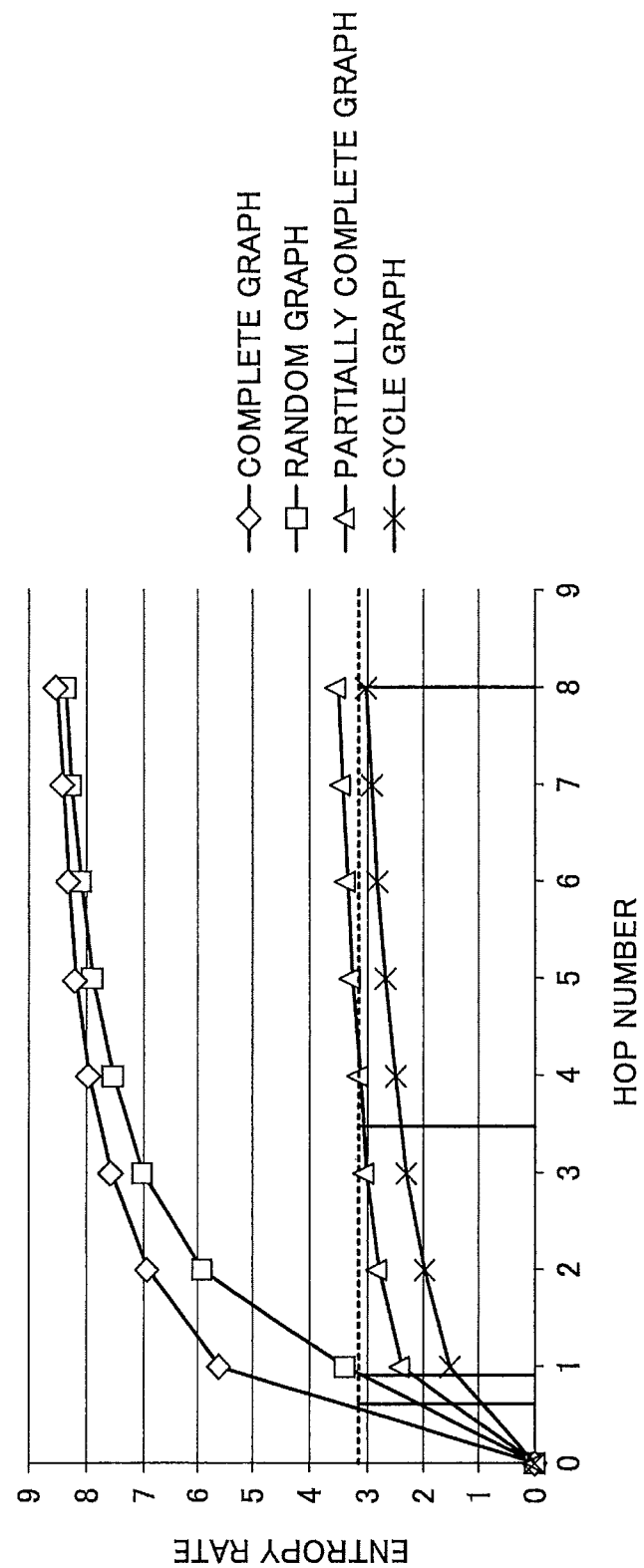
FIG. 9 illustrates relationships between the hop number and entropy rate.

FIG. 9 illustrates relationships between the hop number and entropy rate. In FIG. 9, the vertical axis denotes the entropy rate and the lateral axis denotes the hop number. FIG. 9 illustrates the cases of the access sequence patterns (complete graph, random graph, partially complete graph (clique), cycle graph) of FIG. 7.

As illustrated in FIG. 9, the hop number until the disk access occurs can be acquired in response to the respective access sequence patterns (transition matrixes). Further, it is possible to determine whether it is desired to perform locality on the data access in response to, for example, each of the predetermined data (e.g., each of the data sets). For example, as illustrated in FIG. 9, in a case where the entropy rate is 3.1, the hop number in response to the complete graph is 0.6, the hop number in response to the random graph is 0.8, the hop number in response to the partially complete graph is 3.4, and the hop number in response to the cycle graph is 8.0.

Figure 10:
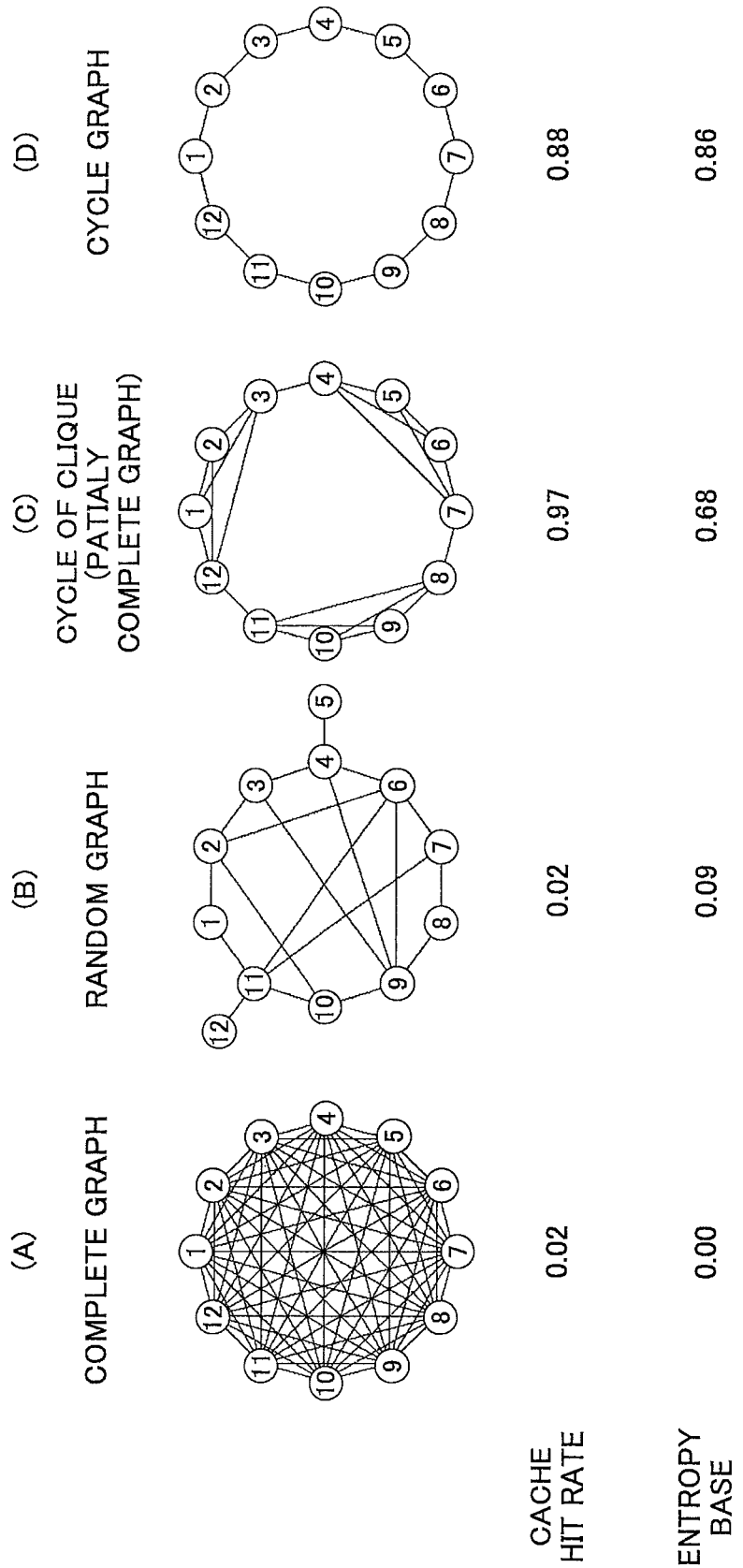
FIG. 10 illustrates relationships between index according to an embodiment and an effect of locality.

FIG. 10 illustrates relationships between indices according to an embodiment and an effect of locality. In FIG. 10, the same access sequence patterns as those in FIG. 7 are illustrated. Namely, part (A) of FIG. 10 illustrates a sequence pattern of the complete graph. Part (B) of FIG. 10 illustrates a sequence pattern of the random graph. Part (C) of FIG. 10 illustrates a cycle of a clique (partially complete graph). Part (D) of FIG. 10 illustrates a cycle graph.

As illustrated in FIG. 10, the cache hit rate, which is the index of the maximum effect of locality for each access sequence, and the index based on the entropy base according to this embodiment are similar to each other in each of the patterns. Therefore, by using the index on the entropy basis, the data access analysis apparatus 12 can analyze in advance whether data are suitable for locality before the data sets are actually reconfigured for locality.

Guess Using Cache Hit Rate

For example, when it is assumed that the segment size is "s", "$\log_2 s$" bits are necessary to predict a specific data (record) in the segment. When the actual entropy rate "e" changes (increases) similar to the value, it is not possible to store within a single segment. The hop number "h" in this state is acquired.

When the transit occurs beyond the acquired hop number, it is thought that the transit to another segment occurs. The segment transition occurs every "h" accesses. Therefore, when it is assumed that the number of accesses is "h", the value "$1-1/h$" is the guess value of the cache hit rate. In this embodiment, the index is not limited to the cache hit rate, and for example, the cache miss rate $(1/h)$ may be used.

In this embodiment, by doing the process described above, it is possible to guess how much the effect of locality due to reconfiguration can be expected before the actual data reconfiguration is performed. Therefore, data reconfiguration can be performed only on the data where the improvement of the performance is surely expected by the data reconfiguration.

Further, it is possible to estimate only based on the sequential access of the disk without actually performing the data configuration. Therefore, it allows a quick, low cost operation.

Specific Example of Data Reconfiguration in a Data Management Apparatus 13

Next, a specific example of the data reconfiguration in the data management apparatus 13 is described. In the following description, the change of the data stored in the segment management archive 22A and the relevance archive 22B in response to the data request input to the input/output management section 41 from the client computer 11 is described. In the following description, "Read(x,y)", which is one example of the data request "Rq", refers to, for example, a request to read data "x" and a report that there exists a relevance between data "x" and data "y" to the input/output management section 41.

Figure 11:
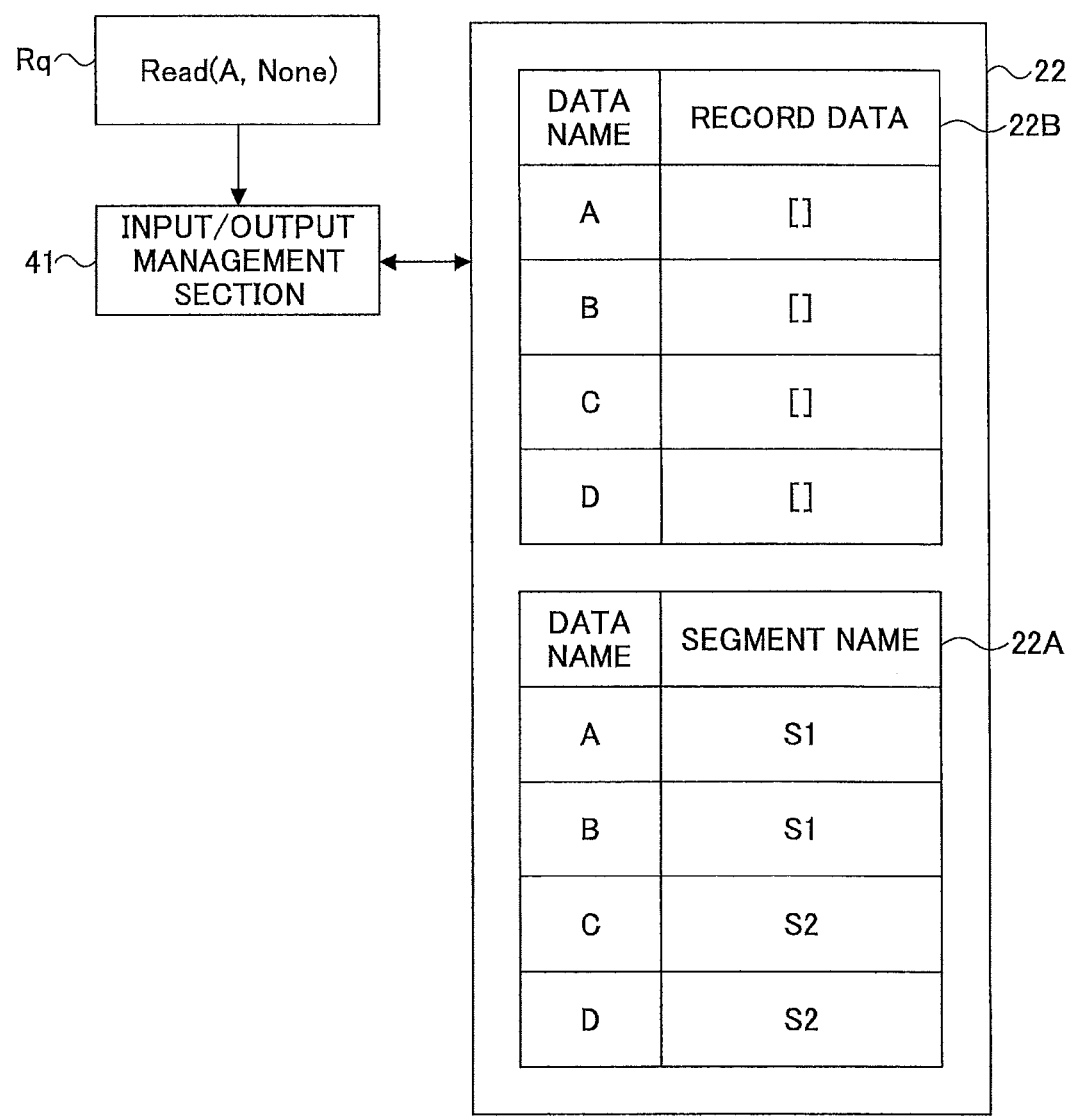
FIG. 11 illustrates a case where data request "Rq" is sent to the data management apparatus.

FIG. 11 illustrates a state where data request "Rq" is sent to the data management apparatus. In the case of FIG. 11, a request to read the data "A" is sent to the input/output management section 41. Further, before the request, there exists no data request (Read (A, None)).

Here, for example, it is assumed that the data request "Rq" input to the data management apparatus 13 includes the information that can identify the previous data requested in the previous request by the same request source. For example, the information of the previous data may be recognized by the client computer 11 itself, or may be recognized by the data management apparatus 13 for each of the request sources. In this case, the data management apparatus 13 stores the record of the data request for each of the request sources in any one of the memory apparatus 22 and the registers thereof.

The input/output management section 41 reads out data "A" from the segment management archive 22A and outputs the data "A" to the request source. The input/output management section 41 refers to the information of the previous data and updates the relevance archive 22B. In the state of FIG. 11, the previous data value is "None" (i.e., there are no previous data in the state). Therefore, the input/output management section 41 does not update the relevance archive 22B.

Figure 12:
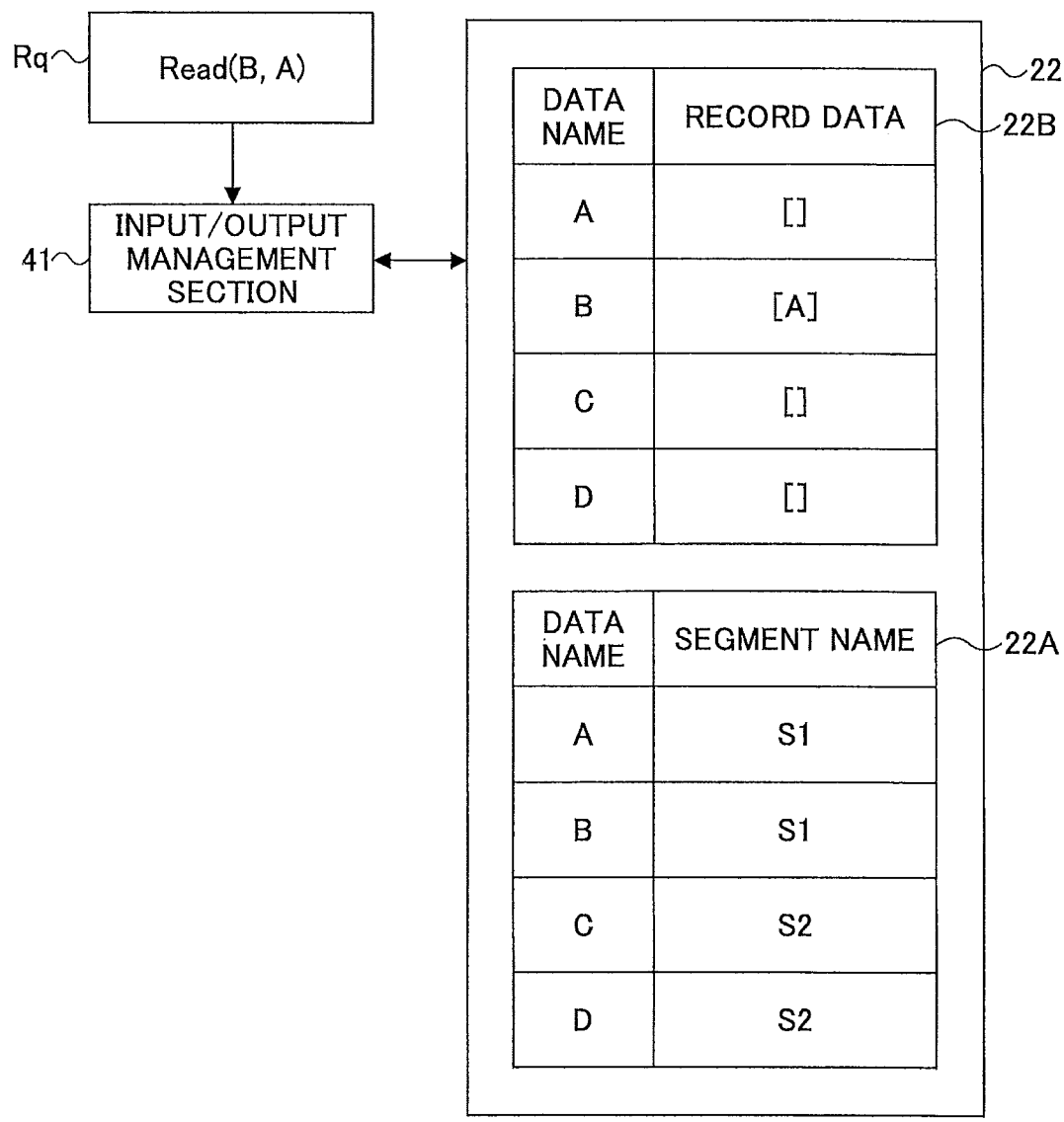
FIG. 12 illustrates a case where the data request "Rq" is further sent to the data management apparatus after the case of FIG. 11.

FIG. 12 illustrates a state where another data request "Rq" is sent to the data management apparatus after the state of FIG. 11. In the state of FIG. 12, the same request source as that in FIG. 11 to read out data "B" sends a request to the data management apparatus 13. In this case, the previous data is data "A" (Read (B,A)).

The input/output management section 41 reads out the data "B" from the segment management archive 22A and outputs the data "B" to the request source. The input/output management section 41 refers to the previous data and updates the relevance archive 22B. In the state of FIG. 12, the previous data is data "A". Therefore, the input/output management section 41 writes one value indicating the data "A" in the column of this data (i.e., the column of "B") of the relevance archive 22B.

When the relevance archive 22B is updated, the analysis requirement determination section 42 determines whether it is desired for the relevance analysis section 43 to perform the relevance analysis. In the state of FIG. 12, this data "B" and the previous data "A" belong to the same segment "S1". Therefore, the analysis requirement determination section 42 determines that it is not desired to perform the relevance analysis.

Figure 13:
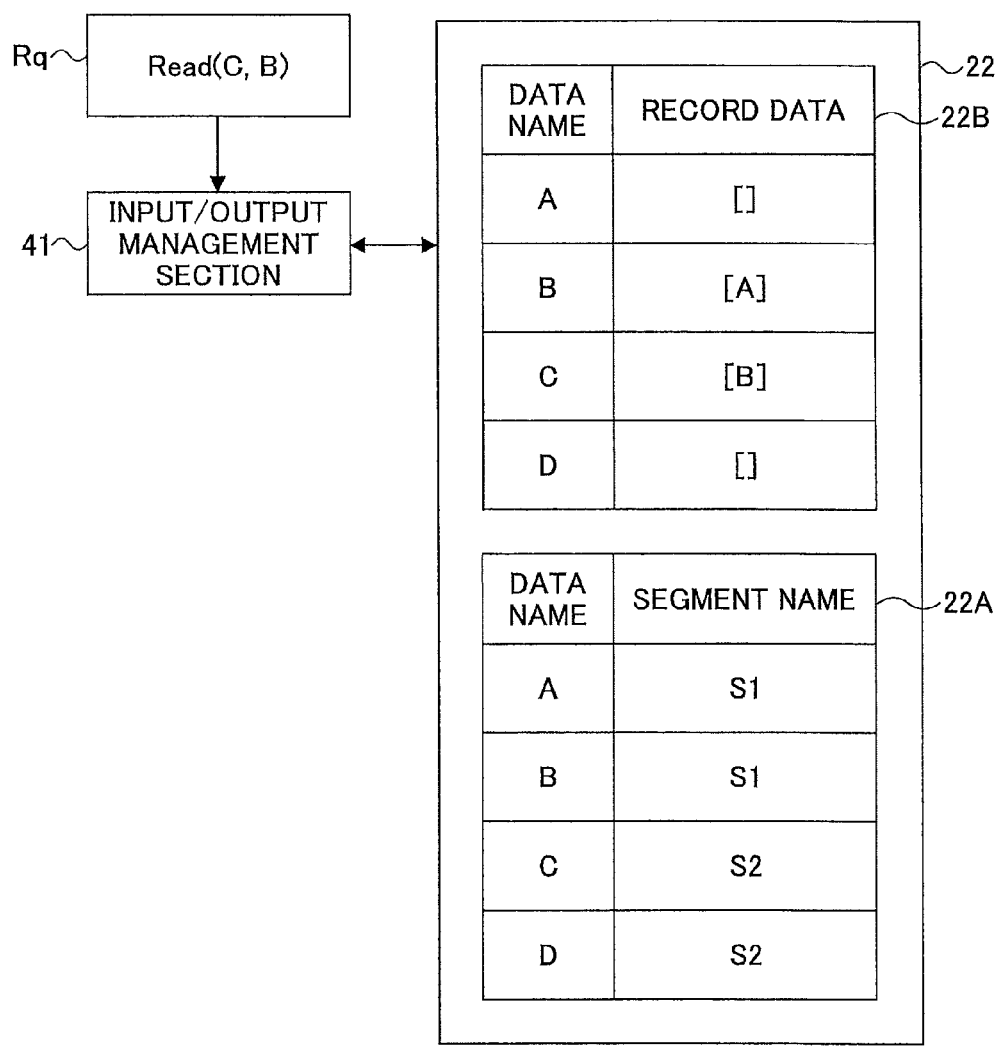
FIG. 13 illustrates a case where the data request "Rq" is further sent to the data management apparatus after the case of FIG. 12.

FIG. 13 illustrates a state where another data request "Rq" is sent to the data management apparatus after the state of FIG. 12. In the state of FIG. 13, a request to read out data "C" is sent to the data management apparatus 13. In this case, the previous data is data "B" (Read (C,B)).

The input/output management section 41 reads out the data "C" from the segment management archive 22A and outputs the data "C" to the request source. The input/output management section 41 refers to the previous data and updates the relevance archive 22B. In the state of FIG. 13, the previous data is data "B". Therefore, the input/output management section 41 writes one value indicating the data "B" in the column of this data (i.e., the column of "C") of the relevance archive 22B.

When the relevance archive 22B is updated, the analysis requirement determination section 42 determines whether it is desired for the relevance analysis section 43 to perform the relevance analysis. In the state of FIG. 13, this data "C" and the previous data "B" belong to different segments. Therefore, the analysis requirement determination section 42 determines that it is desired to perform the relevance analysis. The relevance analysis section 43 analyzes the relevance between those data by using, for example, a method of graph division.

In this embodiment, based on the analysis result acquired from the data access analysis apparatus 12, it is possible to determine whether the data set is suitable for locality by the reconfiguration. Therefore, in this embodiment, only when it is determined that there is an effect of locality for the data set, the data access analysis apparatus 12 performs the process by the relevance analysis section 43. By doing this, it becomes possible to remove wasteful processes and when necessary perform an appropriate reconfiguration process of the disk.

Figure 14:
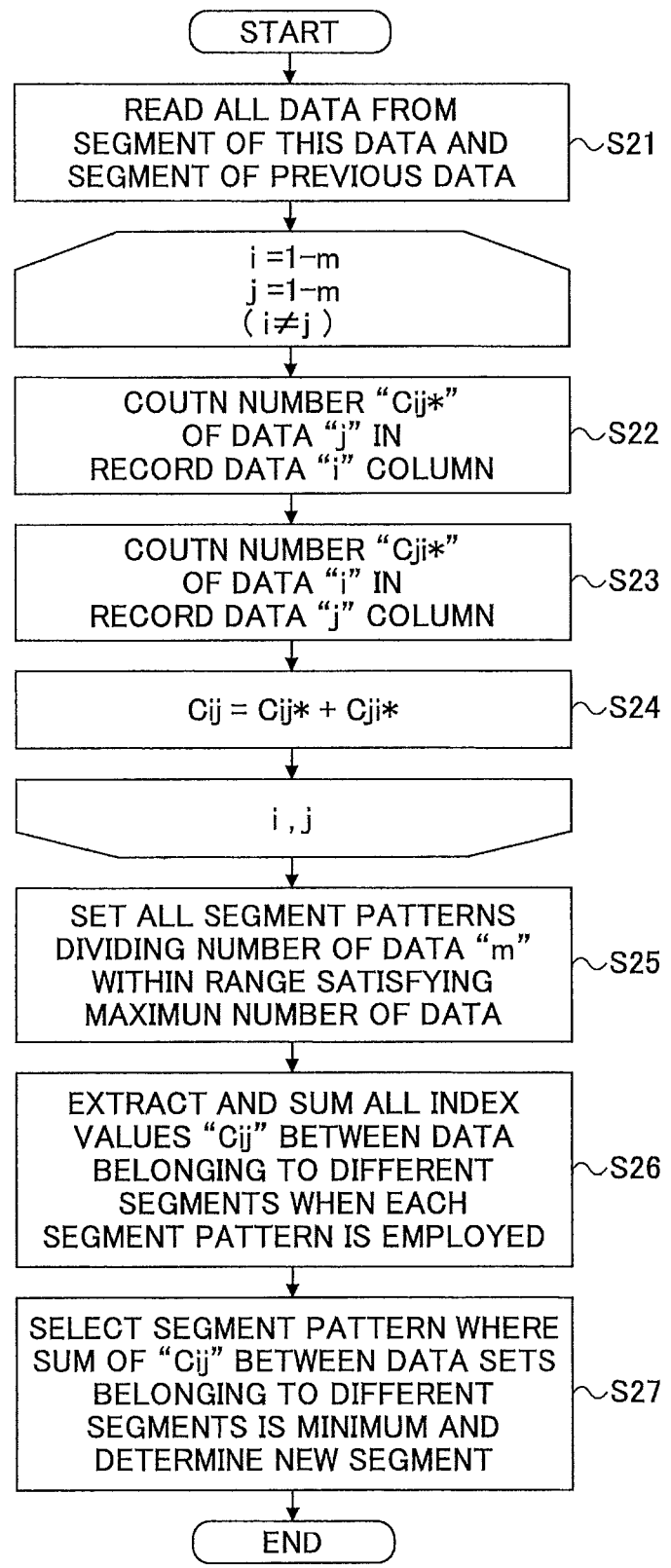
FIG. 14 is a flowchart of an example process of a relevance analysis section.

The relevance analysis section 43 analyzes the relevance between those data sets by using, for example, a method of graph division. FIG. 14 is a flowchart of an example process of the relevance analysis section. In the example of FIG. 14, the relevance analysis section 43 reads all data included in both the segment to which this data belongs and the segment to which the previous data belongs (step S21).

Next, the relevance analysis section 43 picks up data "i" and "j" from the read data, so that the process of steps S22 through S24 can be performed with respect to the combinations of all data "i" and "j" as long as "i≠j". In FIG. 14, the symbol "m" refers to the number of kinds of data that are read in step S21.

The relevance analysis section 43 counts the number "Cij*" of the data "j" in the "record" of the data "i" column stored in the relevance archive 22B (step S22).

Next, the relevance analysis section 43 counts the number "Cji*" of the data "i" in the "record" of the data "j" column stored in the relevance archive 22B (step S23).

Next, the relevance analysis section 43 calculates the sum of "Cij*" and "Cji*" to acquire an index value "Cij" which indicates the relevance between the data "i" and the data "j" (step S24).

The relevance analysis section 43 performs the processes in steps S22 through S24, and sets all segment patterns dividing the number of data "m" within a range satisfying the maximum number of data (e.g., three) in the segment (step S25). In the example of FIG. 13, the number of the data is four. When the maximum number of data is three, the numbers of segment patterns are "four" and "six" under "3:1" and "2:2" divisions, respectively. Therefore, ten segment patterns are set in total.

Next, the relevance analysis section 43 extracts all the index values "Cij" between the data that belong to different segments for each of the segment patterns, and calculates the sum of the extracted index values (step S26). Then, the relevance analysis section 43 selects the segment pattern that has the least sum of the index value "Cij" for the group of the data that are to belong to different segments and determines a segment (step S27).

Figure 15:
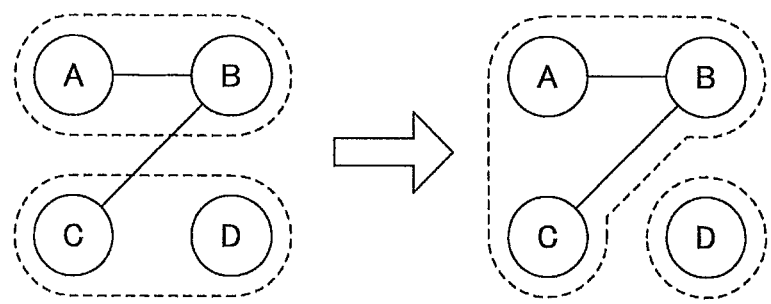
FIG. 15 illustrates arrangement before and after segments are changed by the relevance analysis section in a state of FIG. 13.

FIG. 15 illustrates an example arrangement before and after the segments are changed by the relevance analysis section in the state of FIG. 13. In the example of FIG. 15, the segment configuration before changing is illustrated on the left side (arrow source side) and the segment configuration after the changing is illustrated on the right side (arrow destination side). Further, in the example of FIG. 15, the number of solid lines connecting between, for example, data "A" and data "B" corresponds the index value "Cij", and the dotted lines are boundary lines of the segments.

The above described term "the sum of the index value "Cij" for the group of the data that are to belong to different segments" corresponds to the number of connecting lines that are cut when it is assumed that the index value "Cij" is the number of the virtual connecting lines. In the example of FIG. 15, the number of solid lines that are cut by the boundary lines of the segment {A,B, and C} and the segment {D}. Therefore, the sum of the index value "Cij" is zero.

Figure 16:
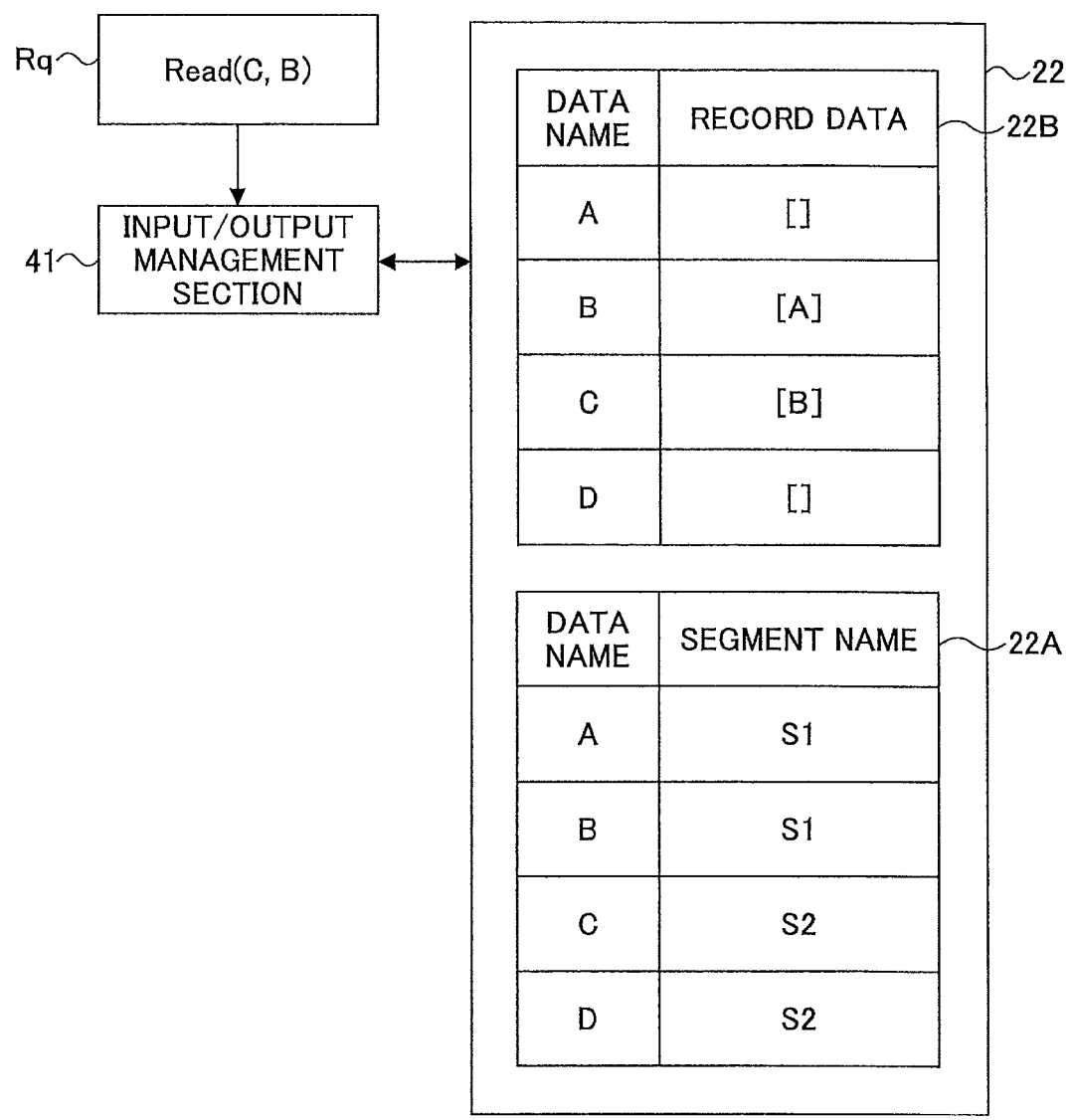
FIG. 16 illustrates associations between data and segments that is changed by a segment arrangement section.

When the relevance analysis section 43 determines a segment, the segment allocation section 44 changes the association between the data and the segments. FIG. 16 illustrates association between the data and the segments that are changed by a segment arrangement section.

Figure 17:
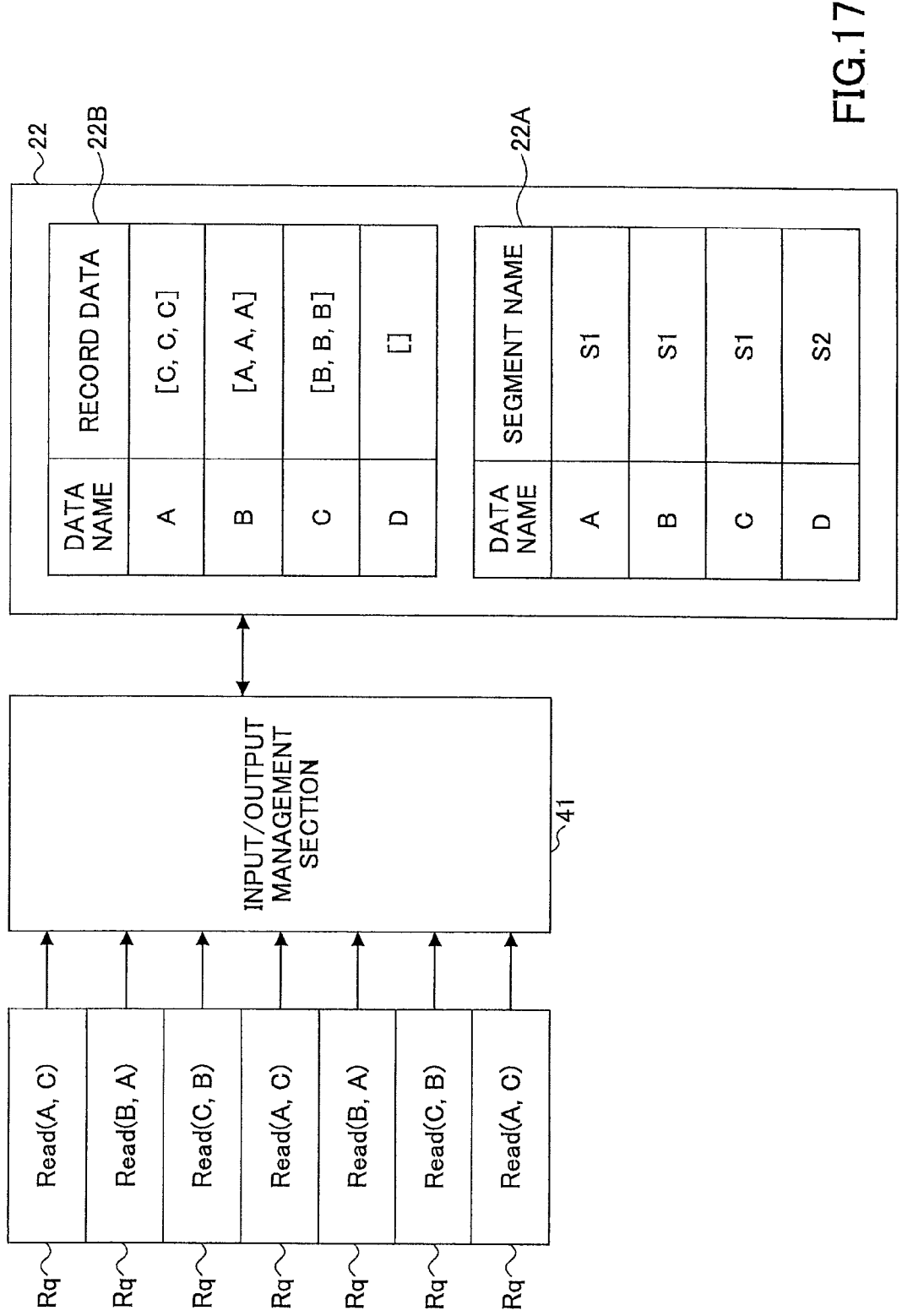
FIG. 17 illustrates a case where the data request "Rq" is sent to the data management apparatus several times after the case of FIG. 16.

FIG. 17 illustrates a case where the data request "Rq" is sent to the data management apparatus several times after the case of FIG. 16. In any of the data requests "Rq" in FIG. 17, this data and the previous data belong to the same segment. Therefore, the relevance archive 22B is updated, but neither the relevance analysis nor the change of the association between the data and the segment are performed.

Figure 18:
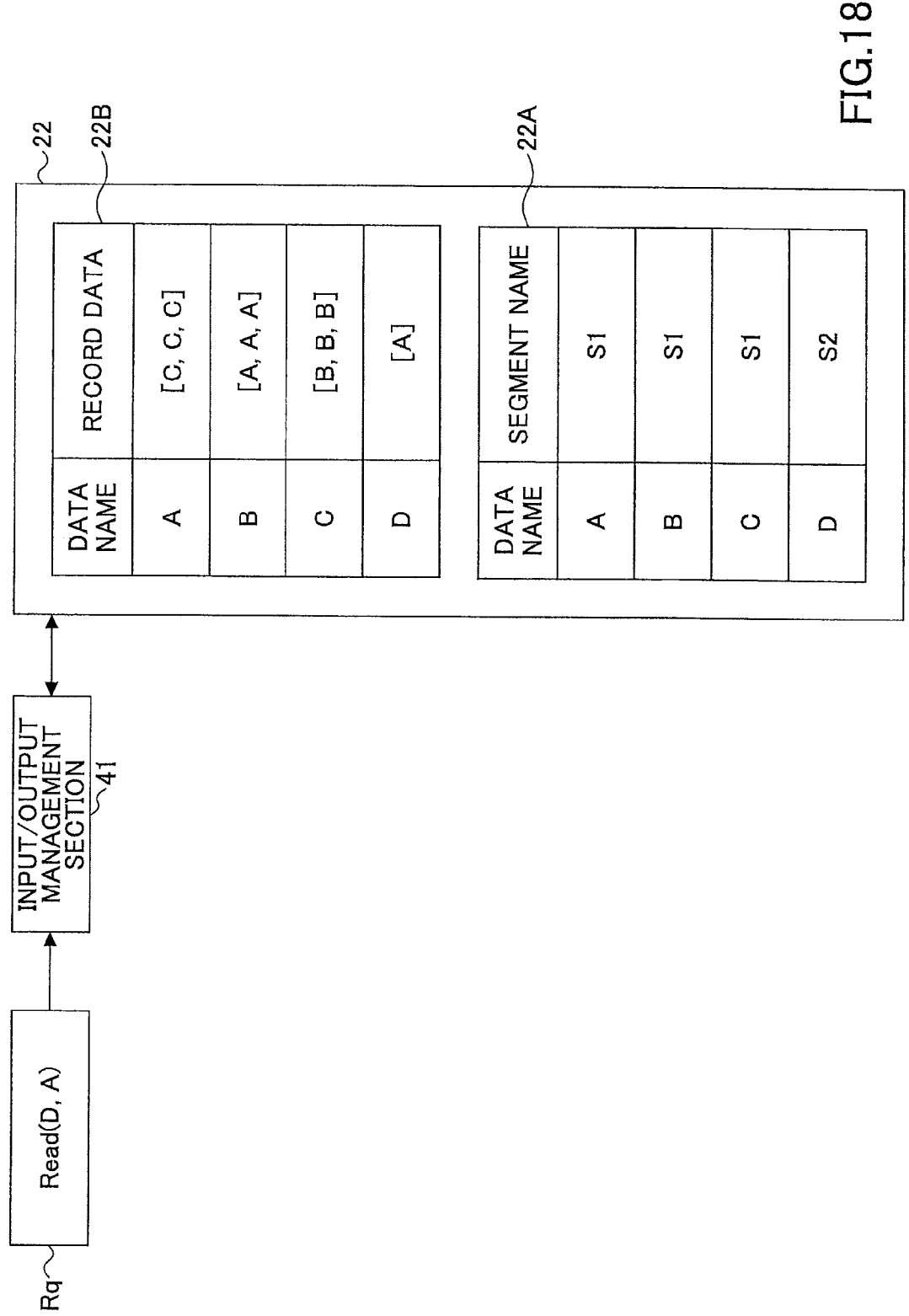
FIG. 18 illustrates a case where the data request "Rq" is further sent to the data management apparatus after the case of FIG. 17.

FIG. 18 illustrates a case where the data request "Rq" is further sent to the data management apparatus after the case of FIG. 17. In the case, this data "D" and the previous data "A" belong to different segments. Therefore, the analysis requirement determination section 42 determines that it is desired to perform the relevance analysis. In the state of FIG. 18, among the data "A", "B", and "C", a plurality of records are already accumulated in the relevance archive 22B.

Figure 19:
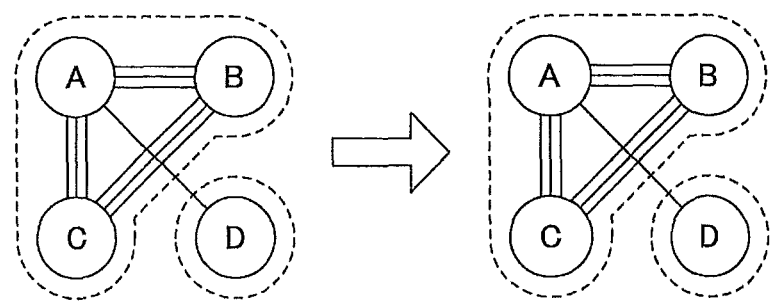
FIG. 19 illustrates example segment configurations before and after the relevance analysis section determines the segment in a state of FIG. 18.

Therefore, the index values "Cij" between A and B, A and C, and B and C are relatively large and the index value between A and D is relatively small. As a result, the relevance analysis section 43 does not change the association between the data and the segment. FIG. 19 illustrates example segment configurations before and after the relevance analysis section determines the segment.

As described above, according to this embodiment, it is possible to analyze whether the data sets are suitable for locality in response to data access. Therefore, it is possible to determine whether data access is in locality without executing relevance calculation using individual data access record, and perform data configuration in the disk in accordance with the locality state.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiment of the present inventions have been described in detail, it is to be understood that various changes, substitutions, and alterations could be made hereto without departing from the spirit and scope of the invention.

What is claimed is:

1. A computer-readable non-transitory recording medium having stored therein a data analyzing program that causes a computer to execute a process, the process comprising:
    acquiring a transition matrix of data access based on a data access record of the data access;
    calculating an entropy rate for each of transition counts by using the transition matrix;
    determining mutual relevance of the data access based on the entropy rate; and
    storing data related to the data access on a disk, allocation of the data on the disk being determined by the mutual relevance of the data access,
    wherein an effect of data locality is analyzed in accordance with a cache hit rate or a cache miss rate acquired based on the entropy rate and predetermined access patterns, and
    the cache hit rate or the cache miss rate is calculated based on the transition counts where the entropy rate exceeds a logarithm of a predetermined segment size.

2. The computer-readable non-transitory recording medium according to claim 1, wherein when N represents integers starting from 1 and indicating order numbers of a Markov chain representing the data access and the entropy rate is acquired for each value of N, the mutual relevance is estimated based on a change state of the entropy rate relative to N.

3. The computer-readable non-transitory recording medium according to claim 1, wherein arrangement of data on the disk based on the data access is controlled based on the mutual relevance.

4. A method for analyzing data access used in a data access analysis apparatus, the method comprising:
    acquiring a transition matrix of data access based on a data access record of the data access;
    calculating an entropy rate for each of transition counts by using the transition matrix;
    determining mutual relevance of the data access based on the entropy rate; and
    storing data related to the data access on a disk, allocation of the data on the disk being determined by the mutual relevance of the data access,
    wherein an effect of data locality is analyzed in accordance with a cache hit rate or a cache miss rate acquired based on the entropy rate and predetermined access patterns, and
    the cache hit rate or the cache miss rate is calculated based on the transition counts where the entropy rate exceeds a logarithm of a predetermined segment size.

5. A data access analysis apparatus comprising:
    a transition matrix generation unit configured to generate a transition matrix of data access based on a data access record of the data access;
    an entropy rate calculation unit configured to calculate an entropy rate for each of transition counts by using the transition matrix; and
    a locality analysis unit configured to determine mutual relevance of the data accesses based on the entropy rate and analyze locality by the mutual relevance of the data access,
    wherein the locality analysis unit analyzes an effect of data locality in accordance with a cache hit rate or a cache miss rate acquired based on the entropy rate and predetermined access patterns, and
    the locality analysis unit calculates the cache hit rate or the cache miss rate based on the transition counts where the entropy rate exceeds a logarithm of a predetermined segment size.

* * * * *